Patented Aug. 2, 1949

UNITED STATES PATENT OFFICE 2,478,038

BETA-SUBSTITUTED ETHYL-MERCAPTO POLYMERS AND PROCESS OF PREPARING SAME

William J. Burke, Marshallton, Del., assignor to E. I. du Pont de Nemours & Company, Wilmington, Del., a corporation of Delaware No Drawing. Application November 1, 1944, Serial No. 561,483

4 Claims. (Cl. 260—79.7)

This invention relates to new beta-substituted ethylmercapto polymers.

This invention has as an object the provision of new polymeric products having the general formula

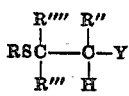

wherein R is the residue of a linear, organic solvent-soluble polymer, R'', R''' and R'''' are members selected from the group consisting of hydrogen atoms and hydrocarbon radicals free from ethylenic unsaturation and Y is a monovalent radical of the group consisting of nitrile, amido, aryl and substituted aryl groups and groups having the general formula

wherein R' is a member of the group consisting of hydrogen atoms, hydroxyl and monovalent organic radicals. Another object is to provide new polymeric products having the general formula

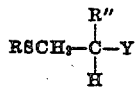

wherein R is the residue of a linear, organic solvent-soluble polymer, R'' is a member of the group consisting of hydrogen atoms and lower alkyl groups and Y is a monovalent radical of the group consisting of nitrile, amido, aryl and substituted-aryl groups and groups having the general formula

wherein R' is a member of the group consisting of hydrogen atoms, hydroxyl, and lower alkyl and alkoxy groups. A further object is to provide new polymeric products containing beta-substituted ethylmercapto groups in the side chain. A still further object is to provide new products of the general formula

wherein X is a rubber residue and Y is a monovalent radical of the group consisting of nitrile, amido, aryl and substituted-aryl groups and groups having the general formula

wherein R' is a member of the group consisting of hydrogen atoms, hydroxyl and lower alkyl and alkoxy groups. Still another object is to provide a method for obtaining said polymeric products. Additional objects will become apparent from an examination of the following description and claims.

These and other objects and advantages are accomplished according to the herein described invention which broadly comprises reacting a linear, organic solvent-soluble polymeric polythioacylate with a monomeric organic compound containing one and only one ethylenic double bond, said ethylenic double bond being alpha to a carbon atom which is attached by at least two of its bonds to an element having an atomic weight within the range of from 11 to 17, said reaction being effected in a homogeneous system containing an alkaline reacting compound as catalyst, and thereafter isolating the resultant product.

One preferred embodiment of this invention comprises reacting a benzene solution of a rubber thioacetate with vinyl cyanide in the presence of an alkaline reacting compound as catalyst.

Another preferred embodiment comprises reacting in a homogeneous system an N(acylthiomethyl)polyamide with vinyl cyanide in the presence of a strong base as catalyst.

By the term "polymer," as employed herein and in the appended claims, is meant a macromolecular organic compound containing a plurality of recurring units which are joined together in a chain-like manner.

By the term "polymeric thioacylate," as employed herein and in the appended claims, is meant the product obtained by reacting an organic solvent-soluble, polymeric, poly-unsaturated organic substance with a monocarbothiolic acid as described in the copending applications of William J. Burke, Serial No. 503,417, filed September 22, 1943 now U. S. P. 2,419,943 issued May 6, 1947 and of Lawrence M. Richards, Serial No. 515,807, filed December 27, 1943 now U. S. P. 2,420,194 issued May 6, 1947.

By "monocarbothiolic acid" is meant an acid of the general formula RCOSH, wherein R is a monovalent radical of the group consisting of alkyl and aryl radicals.

The following examples, in which proportions are in parts by weight unless otherwise specified, are given for illustrative purposes and are not intended to place any restrictions on the herein described invention.

EXAMPLE I

N(acetylthiomethyl)polyhexamethylene adipamide is prepared by reacting 6.1 parts of ethanethiolic acid with 10.8 parts of N(methoxymethyl)polyhexamethylene adipamide (1CH₃OCH₂/2 N)

dissolved in 100 parts of acetic acid containing 2 parts of acetic anhydride and 0.1 part of paratoluene sulfonic acid as a catalyst at room temperature for 1 hour. The soft white solid obtained by addition of water to the reaction mixture is washed with water, dissolved in methanol-water (90-10), reprecipitated in a finely divided condition by addition of acetone, and washed thoroughly with acetone. The product contains 10.02% nitrogen and 2.27% sulfur, which indicates the presence of about 1CH₃COSCH₂/10 N.

Five parts of the N(acetylthiomethyl) polyhexamethylene adipamide, prepared as described above, is wet with an equal weight of water and added with stirring to 32 parts of vinyl cyanide and 4 parts of methanol. To the resulting solution at 40° C. is added 14 parts of a 10% solution of sodium hydroxide in methanol/water (50/50) and 20 parts of vinyl cyanide. After 60 hours at 25° C. a 250 cc. portion of acetone is added and the precipitated product is recovered by filtration and washed thoroughly with acetone, and then with water until free of alkali. The product analyzes 11.2% nitrogen and 2.2% sulfur, which corresponds to about 1 S/11 N. These data correspond to that required for substantially complete replacement of the N(acetylthiomethyl) group with an N-beta cyanoethyl group. The reactions which occur may be indicated by the following equations:

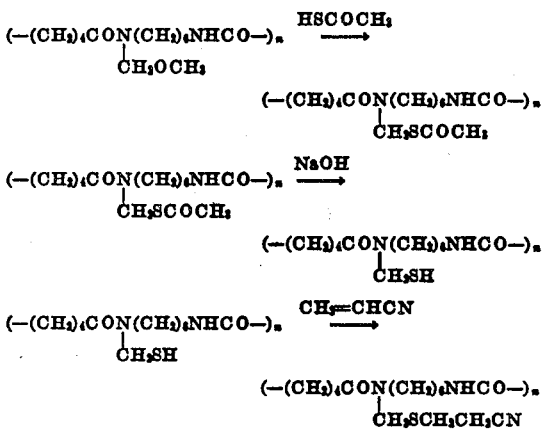

The product prepared as above is readily soluble in methanol/water (90/10) and films cast from such solutions are clear, bright and highly elastic. Upon treatment with alkali, any desired portion of the beta-cyanoethyl groups can be eliminated with the resulting formation of free thiol substituents, which upon exposure to an oxygen-containing atmosphere react to form crosslinked products.

Use of 70 parts of methyl vinyl ketone in place of acrylonitrile in the above example results in the formation of an N(beta-acetylethylmercaptomethyl) derivative.

EXAMPLE II

Rubber thioacetate is prepared by reacting 68 parts of milled pale crepe rubber with 114 parts of ethanethiolic acid (1.5 moles/isoprene unit) in 200 cc. of benzene in the presence of oxygen. After tumbling for 6 days at room temperature the reaction mixture is drowned in methanol. The resulting product is freed from unreacted ethanethiolic acid by thorough washing with methanol. The rubber thioacetate contains 19.72% sulfur which indicates addition of ethanethiolic acid to 79% of the double bonds present in the rubber.

To a solution of 49 parts of the rubber thioacetate (0.3 mol—SCOCH₃), prepared as described above, in 400 parts of benzene under nitrogen is added 10 parts of methanol containing 2.6 parts of sodium methylate (0.04 mole). After 10 minutes at room temperature 150 parts of vinyl cyanide (2 moles) is added. The solution is heated at 70° C. for 30 minutes, kept at 25° C. for 3 hours and then poured into a methanol/solid carbon dioxide mixture. The precipitated product is washed thoroughly with methanol, redissolved in benzene, precipitated in methanol, washed with methanol and dried. The product analyzes 20.5% sulfur and 0.84% nitrogen which corresponds to replacement of about 10% of the acetylmercapto groups with beta-cyanoethyl mercapto substituents.

The polymeric beta-cyanoethylmercapto derivative prepared as described above is a soft, light-colored, solid which readily forms clear films when cast from benzene solution Use of larger quantities of alkali, for example 0.3 mol of sodium methylate, in the above reaction makes possible the replacement of substantially all of the acetyl groups with beta-cyanoethyl substituents. Treatment of such products with alkali results in the elimination of any desired portion of the beta-cyanoethyl substituent with the formation of a product containing free thiol groups. Such a treatment is particularly useful when it is desirable to insolubilize shaped objects, since products containing free thiol groups become insoluble upon exposure to air.

In place of the rubber thioacetate used in the above example, there can be utilized in the reaction with vinyl cyanide a variety of other polymeric thioacetates from linear diene polymers. Specific examples of such polymeric thioacetates, along with their method of preparation, are given in the following table.

| Polymeric Unsaturate | Reaction Conditions [1] | | | | Product [2] | |
|---|---|---|---|---|---|---|
| | Mols Ethanethiolic acid | Time, Days | Temp., degrees | Catalyst | Percent S | Percent addition |
| Isobutylene-Butadiene Interpolymer (30:1) | 5.0 | 4 | 25 | O₂ | 0.3 | 21 |
| Butadiene Vinyl Cyanide Interpolymer (3:2) | 1.75 | 2 | 25 | 4.4% ascaridol | 13.0 | 51 |
| Polyfluoroprene | 2.0 | 2 | 25 | 4% ascaridol | 3.0 | 7 |
| Butadiene-Styrene Interpolymer (6:1) | 0.22 | 3 | 25 | O₂ | 4.6 | 12 |
| Do | 0.50 | 7 | 25 | O₂ | 8.2 | 23 |
| Do | 0.8 | 8 | 25 | O₂ | 16.8 | 63 |
| Do | 1.0 | .75 | 25 | O₂ and 1% ascaridol | 17.0 | 65 |
| Do | 1.5 | 4 | 25 | air | 16.0 | 58 |
| Do | 1.5 | 5 | 25 | O₂ and 3.5% ascaridol | 19.5 | 86 |
| Natural Rubber | 0.5 | 7 | 25 | O₂ | 10.3 | 28 |
| Do | 1.0 | 1 | 25 | O₂ and 0.7% ascaridol | 11.4 | 34 |
| Do | 1.0 | 3 | 25 | None N₂ atmosphere | 2.5 | 6 |
| Do | 2.0 | 0.5 | 80 | O₂ and 4% ascaridol | 12.7 | 39 |
| Do | 1.5 | 5 | 25 | O₂ | 18.3 | 69 |
| Do | 2.0 | 4 | 25 | O₂ and 3.5% ascaridol | 21.4 | 93 |

[1] All of the reactions were carried out in the presence of benzene.
[2] Percent addition refers to the percentage of available double bonds utilized in reaction with ethanethiolic acid.

EXAMPLE III

A mixture of 20 parts of 7-mercaptoheptanoic acid, 11.5 parts of glycerol, and 18.4 parts of phthalic anhydride is reacted at 190–200° C. for 2.5 hours in a reactor fitted with a stirrer, a thermometer, a gas inlet tube for inert gas, and a condenser fitted with a take-off for removal of water and return of solvent to the reaction mixture. The mixture is brought to 80° C., 25 parts of xylene is added, and the temperature is then raised to 130° C., whereupon vigorous refluxing occurs. Thereafter the temperature is raised to 220° C. where it is maintained for 2.5 hours, sufficient high-flash naphtha being present to maintain a vigorous reflux. On being cooled, the mixture is thinned with 12 parts of high-flash naphtha, 16.6 parts xylene, 11.8 parts of butanol, and 0.2 part of butyl acetate giving a light colored solution with a viscosity of about 0.5 poise. The product shows an acid number of 27.1, a total sulfur content of 3.1%, and a thiol sulfur value of 1.8%. Films of this material are still tacky even after baking for 24 hours at 100° C.

A mixture of 100 parts of the above mixed glyceride with 50 parts of phorone gives films which are tack-free after baking 2 hours at 100° C. in air.

As illustrated by the examples, the compositions of the present invention are had by reacting an organic solvent-soluble polymeric thioacylate with a monomeric organic compound containing one and only one ethylenic double bond, said ethylenic double bond being alpha to a carbon atom which is attached by at least two of its bonds to an element having an atomic weight between 11 and 17, in a homogeneous system under alkaline conditions.

Any organic solvent-soluble polymeric thioacylate may be used in the practice of this invention. Furthermore, the corresponding thiols can also be used. Of course, it is to be understood that by "corresponding thiol" is meant the thiol had by replacing the thioacyl groups of a polymeric thioacylate with thiol groups. A polymeric polythiol can be obtained from the corresponding polythioacylate by hydrolysis under non-oxidizing conditions. For practical reasons it is preferred to employ the polymeric thioacylate rather than the corresponding thiol in the practice of this invention since the thioacylates are stable in the presence of air and as a consequence no special procedures are required therewith to obtain the desired products of the formula:

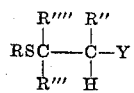

as hereinbefore defined.

Polymeric thioacylates suitable for use in the practice of this invention are conveniently made by the methods described in the copending applications of William J. Burke, Serial No. 503,417, filed September 22, 1943 now U. S. P. 2,419,943 issued May 6, 1947 and of Lawrence M. Richards, Serial No. 515,807, filed December 27, 1943 now U. S. P. 2,420,194 issued May 6, 1947. These include the thiols and thioacylates of the polymers derived from butadiene-1-3, allene, isoprene, vinyl cyclohexene, cyclopentadiene, 1-2-bis(vinyloxy)ethane, divinyl formal, divinyl acetal, divinyl sulfide and the like; unsaturated condensation polymers such as polyesters, e. g., the reaction products of polyhydric alcohols with polycarboxylic acids, polyethers, polysulfides, polyamides, polyesters, polyacetals, etc. prepared from components at least one of which contains at least one olefin double bond; unsaturated alcohol-modified urea formaldehyde, melamine-formaldehyde, and phenol-formaldehyde polymers; unsaturated derivatives of such film-forming polymers as starch, polyvinyl alcohol, etc.; partially polymerized drying oils, e. g., heat bodied linseed oil, and heat bodied China-wood oil, etc.; the linear diene polymers obtained by polymerizing diene hydrocarbons in admixture with one another and with other polymerizable organic compounds. Examples of such dienes are butadiene-1,3, isoprene, dimethyl-2-3-butadiene-1-3, and the like. Examples of unsaturated organic compounds which can be polymerized with the above dienes are styrene, pinene, isobutylene, camphene, monovinyl acetylene, etc., vinylethinylalkyl carbinols, vinyl acetate, vinyl chloride, unsaturated aldehydes and ketones, such as, acrolein, methyl vinyl ketone, etc., acrylic and methacrylic acids and their esters, amides, imides, and nitriles, e. g., butyl acrylate, methyl methacrylate, acrylonitrile, methacrylonitrile, etc., alpha-chloroacrylic acid and its esters, e. g. methyl alpha-chloroacrylate, octyl-alpha-chloroacrylate, etc. furyl acrylic acid and its esters, e. g., methyl furyl acrylate, etc., esters of 1,4-butenedioic acids, e. g. dimethyl fumarate, dimethyl maleate, etc. In place of the synthetic polymers there can be used naturally occurring unsaturated polymers, e. g. natural rubber, gutta percha, etc.

Polymeric thioacylates prepared by reaction of a carbothiolic acid with a polymeric N-oxymethylcarbonamide, as described in the copending application of W. J. Burke, Serial No. 524,623, filed March 1, 1944 now U. S. P. 2,418,497 issued April 8, 1947, and the corresponding polythiols can also be used in this invention. Specific types of polymeric thioacylates and particularly thioacetates include those prepared in this manner from N-alkoxymethyl, or N-hydroxymethyl derivatives of polyamides, such as hexamethylene adipamide and decamethylene sebacamide, polyesteramides such as hexamethylene sebacate adipamide, urea-formaldehyde resins including alcohol modified products, etc. Those prepared by reacting suitable polymeric thioacylates also include carbothiolic acids, particularly ethanethiolic acid, with organic solvent-soluble high molecular weight polymers having ethylenically unsaturated side chains attached to the main polymer chain through oxygen. The preparation of these products and the corresponding polythiols are described in the copending application of William J. Burke, Serial No. 525,093, filed March 4, 1944 now U. S. P. 2,384,888 issued September 18, 1945. Specific suitable polymeric thioacetates include those prepared by the above process from crotyl cellulose, crotyl ethylcellulose, crotyl methyl starch, allyl ethyl starch, methalkyl ethers of polyvinyl alcohol, N-allyloxypolyhexamethylene adipamide, and mixed acetals of polyvinyl alcohol with butyraldehyde and acrolein.

While this invention has been illustrated with particular reference to the use of vinyl cyanide and methylvinyl ketone, it is to be understood that any monomeric organic compound containing one and only one ethylenic double bond may be employed therein, provided said ethylenic double bond is alpha to a carbon atom which is attached by at least two of its bonds to an element having an atomic weight within the range of from 11 to 17. Broadly, said monomeric organic compound has the general formula

wherein R'', R''' and R'''' are members of the group consisting of hydrogen atoms and monovalent organic radicals free from ethylenic unsaturation and Y is a monovalent organic radical of the group consisting of nitrile, amido, aryl and substituted aryl groups and groups having the general formula

wherein R' is a member of the group consisting of hydrogen atoms, hydroxyl and monovalent organic radicals. While R'', R''' and R'''' may be any monovalent organic radicals which are free from ethylenic unsaturation, it is preferred, on account of superior results had therewith, that said radicals should be lower alkyl radicals, i. e. alkyl radicals containing not more than 5 carbon atoms. While any compound having the formula

as hereinbefore defined, may be employed in my process, substantially improved yields are had when said monomeric organic compound contains a terminal methylene group, i. e. when said compound has the general formula

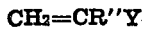

wherein R'' is a member of the group consisting of hydrogen atoms and lower alkyl radicals and Y is a monovalent organic radical of the group consisting of nitrile, amido, aryl and substituted aryl groups and groups having the general formula

wherein R' is a member of the group consisting of hydrogen atoms, hydroxyl, and lower alkyl and alkoxy groups. Optimum results are obtained when said monomeric organic compound has the formula $CH_2=CHY$, wherein Y is a monovalent organic radical of the group consisting of nitrile, amido, aryl and substituted aryl groups and groups having the general formula

wherein R' is a member of the group consisting of hydrogen atoms, hydroxyl, and lower alkyl and alkoxy groups.

Included among examples of monomeric organic compounds containing one and only one ethylenic double bond and in which said double bond is alpha to a carbon atom which is attached by at least two of its bonds to an element having an atomic weight within the range of from 11 to 17 are: methyl methacrylate, benzyl vinyl ketone, styrene, acrylamide, benzalacetophenone, isobutyl acrylate, crotonic acid, and in general unsaturated monomeric compounds characterized by the presence of an activating group alpha to an ethylenic double bond. Suitable activating groups include carbonyl, nitrile, phenyl and substituted phenyl. Reactive unsaturated compounds having a single ethylenic double bond are preferred since they react with particular ease and yield soluble products. Reactive unsaturates having more than one double bond yield cross-linked products whose utility is limited for many purposes because of insolubility.

As a rule at least one mol of reactive unsaturate is used per thiol or thioacylate group present in the polymeric polythiol or corresponding thioacylate, although for certain specific purposes it is desirable to use smaller quantities of the unsaturate. It is often advantageous to use an excess of reactive unsaturate over that required by theory in order to accelerate the reaction and favor more complete reaction which leads to a product having good solubility characteristics.

The reaction of the present invention is catalyzed by the presence of an alkaline reacting compound. Any alkaline reacting compound, either organic or inorganic, which yields hydroxyl ions in aqueous solution and has a basic dissociation constant of at lease $1 \times 10^{-5}$, may be employed. Examples of said compounds include pyridine, N-ethyl morpholine, N-methyl morpholine, potassium carbonate, trimethyl benzyl ammonium hydroxide, potassium hydroxide and the like.

The process of this invention may be operated at any temperature within the range of from 25° C. to 150° C. If desired, however, temperatures ranging up to the decomposition temperature of the reactants or reaction products can be used.

The reaction time will vary depending upon the particular reactants, catalysts, and reaction temperature. In general, from 1–60 hours at a temperature in the range up to 150° C. is sufficient.

The use of an added solvent is not essential and many of the reactive unsaturates can be used with advantage both as reactants and as solvents. A large variety of inert solvents are suitable for use in the reaction. The choice of a particular solvent will depend very largely on the polymeric polythioacylate or polythiol used. For example, with hydrocarbon thioacetates such as those derived from styrene/butadiene interpolymers, benzene, xylene and the aromatic hydrocarbons are excellent solvents. With more polar type polymers such as N-(acetylthiomethyl)-polyhexamethylene adipamide the use of an alcohol in combination with the reactive unsaturate is often helpful in obtaining a more homogeneous reaction mixture. Other suitable inert solvents include dioxane, aromatic hydrocarbons and alcohol mixtures, e. g., toluene/ethanol, 1,2-dimethoxyethane, pyridine, and dichloroethylene.

As hereinbefore stated, the novel products of this invention are obtained by reacting a monomeric organic compound having the general formula

wherein R'', R''' and R'''' are members of the group consisting of hydrogen atoms and monovalent organic radicals free from ethylenic unsaturation and Y is a monovalent organic radical of the group consisting of nitrile, amido, aryl and substituted aryl groups and groups having the general formula

wherein R' is a member of the group consisting of hydrogen atoms, hydroxyl and monovalent organic radicals, with a linear organic solvent-soluble polymeric polythioacylate to provide a polymeric product having the general formula

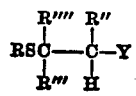

wherein R is the residue of a linear, organic solvent-soluble polymer, R'', R''' and R'''' are members of the group consisting of hydrogen atoms and monovalent organic radicals free from ethylenic unsaturation and Y is a monovalent organic radical of the group consisting of nitrile, amido, aryl and substituted aryl groups and groups having the general formula $$-\overset{O}{\underset{\parallel}{C}}-R'$$

wherein R' is a member of the group consisting of hydrogen atoms, hydroxyl and monovalent organic radicals. For instance, in the following table are given the characteristic structural units of the products formed by reaction in the presence of an alkaline reacting compound of representative linear, organic solvent-soluble polymeric thioacetates with representative monomeric organic compounds of the formula $$R'''R''''C=CR''Y$$

as hereinbefore defined.

to be understood that I do not limit myself to the specific embodiments thereof except as defined in the appended claims.

Having described the present invention, the following is claimed as new and useful:

1. A polymeric product having the general formula $$XSCH_2CH_2CN$$

wherein X is the residue of a linear polymer of a 1,3-diene hydrocarbon containing not more than 6 carbon atoms and where the S is directly attached to a carbon atom of the diene unit of the polymer.

2. The process for obtaining a polymeric product having the general formula $$RS\overset{R''''}{\underset{R'''}{\overset{|}{C}}}-\overset{R''}{\underset{H}{\overset{|}{C}}}-Y$$

wherein R is the residue of a linear, organic solvent-soluble, macromolecular polymer, R'', R''' and R'''' are members of the group consisting of hydrogen atoms and methyl radicals and Y Table

| Polymeric Thioacetate | R'''R''''C=CR''Y | Characteristic Structural Unit in Product |
|---|---|---|
| Rubber Thioacetate | $CH_2=\overset{CH_3}{\underset{\phantom{x}}{C}}-COOCH_3$<br>methyl methacrylate | $-CH_2CHCHCH_2-$<br>$\phantom{xxx}\|$<br>$\phantom{xx}SCH_2CHCOOCH_3$<br>$\phantom{xxxxxxxxx}\|$<br>$\phantom{xxxxxxxxx}CH_3$ |
| Butadiene-Styrene Interpolymer Thioacetate | $CH_2=CH-COOC_2H_5$<br>ethyl acrylate | $\phantom{xxxxxxxxxxxx}C_6H_5$<br>$\phantom{xxxxxxxxxxxxx}\|$<br>$-CH_2-CH-CH_2-CH_2-CH-CH_2-$<br>$\phantom{xxxx}\|$<br>$\phantom{xxx}SCH_2CH_2COOC_2H_5$ |
| N-acetylthiomethyl poly (hexamethylene sebacamide) | $CH_2=CH-C_6H_5$<br>styrene | $-(CH_2)_6-CON(CH_2)_8NHCO-$<br>$\phantom{xxxxxxxx}\|$<br>$\phantom{xxxxxxxx}CH_2$<br>$\phantom{xxxxxxxx}\|$<br>$\phantom{xxxxxxx}SCH_2CH_2C_6H_5$ |
| Butadiene-Vinyl Cyanide Interpolymer Thioacetate | $CH_3CH=CHCOOC_4H_9$<br>butyl crotonate | $\phantom{xxxxxxxxxxxxxx}CN$<br>$\phantom{xxxxxxxxxxxxxxx}\|$<br>$-CH_2-CHCH_2-CH_2-CH_2-CH-$<br>$\phantom{xxxxxxx}\|$<br>$\phantom{xxxxxx}S-CH-CH_2COOC_4H_9$<br>$\phantom{xxxxxxxxx}\|$<br>$\phantom{xxxxxxxxx}CH_3$ |
| Rubber Thioacetate | $CH_2=CH-CONH_2$<br>acrylamide | $\phantom{xxxxxx}CH_3$<br>$\phantom{xxxxxxx}\|$<br>$-CH_2-CH-CH-CH_2-$<br>$\phantom{xxxx}\|$<br>$\phantom{xxx}SCH_2-CH_2CONH_2$ |
| Do | $CH_2=\overset{CH_3}{\underset{\phantom{x}}{C}}-CN$<br>methacrylonitrile | $\phantom{xxxxxx}CH_3$<br>$\phantom{xxxxxxx}\|$<br>$-CH_2-CH-CH-CH_2-$<br>$\phantom{xxxx}\|$<br>$\phantom{xxx}SCH_2CH-CN$<br>$\phantom{xxxxxxxxx}\|$<br>$\phantom{xxxxxxxxx}CH_3$ |
| Do | $(CH_3)_2C=\overset{CH_3}{\underset{\phantom{x}}{C}}-COOCH_3$<br>methyl-alpha, beta-dimethyl crotonate | $\phantom{xxxxxx}CH_3$<br>$\phantom{xxxxxxx}\|$<br>$-CH_2-CH-CH-CH_2-$<br>$\phantom{xxxx}\|$<br>$\phantom{xxx}S$<br>$\phantom{xxx}\|$<br>$(CH_3)_2C-CH-COOCH_3$<br>$\phantom{xxxxxxxxx}\|$<br>$\phantom{xxxxxxxxx}CH_3$ |
| Do | $C_6H_5CH=CHCOC_6H_5$<br>benzalacetophenone | $\phantom{xxxxxx}CH_3$<br>$\phantom{xxxxxxx}\|$<br>$-CH_2-CH-CH-CH_2-$<br>$\phantom{xxxx}\|$<br>$\phantom{xxx}S$<br>$\phantom{xxx}\|$<br>$C_6H_5CH-CH_2COC_6H_5$ |

The products of this invention are useful in the preparation of pellicles, fibers, coating compositions and the like.

As many apparently widely different embodiments of this invention may be made without departing from the spirit and scope thereof, it is is a monovalent organic radical of the group consisting of nitrile, amido, aryl and substituted aryl groups and groups having the general formula $$-\overset{O}{\underset{\parallel}{C}}-R'$$

wherein R' is a member of the group consisting of hydrogen atoms, hydroxyl and monovalent organic radicals, which comprises reacting a linear, organic solvent-soluble polymeric polythioacylate with a monomeric organic compound containing one and only one ethylenic group, said group being alpha to a carbon atom which is attached by at least two of its bonds to an element of the group consisting of carbon, nitrogen and oxygen, said reaction being effected in a homogeneous system containing an alkaline reacting compound which yields hydroxyl ions in aqueous solution and has a basic dissociation constant of at least $1 \times 10^{-5}$, as catalyst.

3. The process for obtaining a polymeric product having the general formula $XSCH_2CH_2CN$, wherein X is the residue of a linear polymer of a 1,3-diene hydrocarbon containing not more than 6 carbon atoms and where the S is directly attached to a carbon atom of the diene unit of the polymer, which comprises reacting a benzene solution of the thioacetate of said linear polymer with vinyl cyanide in the presence of an alkaline reacting compound which yields hydroxyl ions in aqueous solution and has a basic dissociation constant of at least $1 \times 10^{-5}$, as catalyst.

4. The process for obtaining a polymeric product having the general formula $ZSCH_2CH_2CN$, wherein Z is the residue of an N(acetylthiomethyl)polyamide, which comprises reacting in a homogeneous system an N(acetylthiomethyl)-polyamide with vinyl cyanide in the presence of an alkaline reacting compound which yields hydroxyl ions in aqueous solution and has a basic dissociation constant of at least $1 \times 10^{-5}$, as catalyst.

WILLIAM J. BURKE.

REFERENCES CITED

The following references are of record in the file of this patent:

UNITED STATES PATENTS

| Number | Name | Date |
|---|---|---|
| 2,125,649 | Reppe | Aug. 2, 1939 |
| 2,316,129 | Bock | Apr. 6, 1943 |
| 2,317,736 | D'Alelio | Apr. 27, 1943 |
| 2,332,049 | Bock | Oct. 19, 1943 |
| 2,341,553 | Houtz | Feb. 15, 1944 |
| 2,347,182 | Coffman | Apr. 25, 1944 |
| 2,352,435 | Hoeffelman | June 27, 1944 |